United States Patent
Dooley et al.

(10) Patent No.: US 11,173,468 B2
(45) Date of Patent: *Nov. 16, 2021

(54) POLYMER FLAKE DEGASSING SYSTEM AND METHODS

(71) Applicant: Chevron Phillips Chemical Company LP, The Woodlands, TX (US)

(72) Inventors: Kenneth A. Dooley, Porter, TX (US); Jeffrey S. Lowell, Huffman, TX (US); Joseph Curren, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,247

(22) Filed: Jul. 6, 2020

(65) Prior Publication Data
US 2020/0330954 A1    Oct. 22, 2020

Related U.S. Application Data

(63) Continuation of application No. 15/981,532, filed on May 16, 2018, now Pat. No. 10,730,032.

(51) Int. Cl.
*C08F 210/16* (2006.01)
*C08F 2/01* (2006.01)
(Continued)

(52) U.S. Cl.
CPC .......... *B01J 19/24* (2013.01); *B01D 19/0005* (2013.01); *B01D 19/0036* (2013.01);
(Continued)

(58) Field of Classification Search
CPC .. C08F 2/34; C08F 2/01; C08F 110/02; C08F 210/16
See application file for complete search history.

(56) References Cited

U.S. PATENT DOCUMENTS

| | | |
|---|---|---|
| 3,797,707 A | 3/1974 | Jenike |
| 3,799,234 A | 3/1974 | Skidmore |

(Continued)

FOREIGN PATENT DOCUMENTS

| | | |
|---|---|---|
| CN | 102432703 A | 5/2012 |
| CN | 204400887 U | 6/2015 |

(Continued)

OTHER PUBLICATIONS

Buchelli, et al., "Determination of Polyolefin Powder Flow Characteristic in a Purge Column During Transitions," Ind. Eng. Chem. Res., 2007, vol. 46, No. 24, pp. 8120-8129.

(Continued)

*Primary Examiner* — Rip A Lee
(74) *Attorney, Agent, or Firm* — Eversheds Sutherland (US) LLP (57) ABSTRACT

Systems and methods for improved degassing of polymer flake are provided herein. These systems include a polymerization reactor configured to polymerize one or more olefin monomers and produce a product stream comprising solid polymer flake entrained in a fluid; a flash chamber configured to separate the solid polymer flake from the fluid and to produce a fluid stream and a concentrated stream; and a first degassing chamber configured to separate the concentrated stream by contacting the concentrated stream with a purge fluid comprising one or more light hydrocarbons to produce a partially degassed polymer flake stream and a purge fluid stream.

20 Claims, 1 Drawing Sheet

(51) Int. Cl.
  *B01J 19/24* (2006.01)
  *B01D 19/00* (2006.01)
  *C08F 110/02* (2006.01)

(52) U.S. Cl.
  CPC ......... *C08F 110/02* (2013.01); *B01J 2219/24* (2013.01); *C08F 2/01* (2013.01); *C08F 210/16* (2013.01)

(56) References Cited

U.S. PATENT DOCUMENTS

| | | | |
|---|---|---|---|
| 4,372,758 A | 2/1983 | Bobst | |
| 4,372,759 A | 2/1983 | Sederquist | |
| 4,452,977 A | 6/1984 | Brasz | |
| 4,499,263 A | 2/1985 | Messura | |
| 4,906,329 A | 3/1990 | Tominari | |
| 5,157,202 A | 10/1992 | Bauer | |
| 5,322,927 A | 6/1994 | Ramachandran | |
| 5,376,742 A | 12/1994 | Krause | |
| 5,462,351 A | 10/1995 | Royal | |
| 5,769,927 A | 6/1998 | Gottschlich | |
| 5,789,501 A * | 8/1998 | Chapman | C08F 6/005 526/68 |
| 5,799,412 A * | 9/1998 | Yamamoto | F26B 21/14 34/582 |
| 5,955,569 A | 9/1999 | Dujari | |
| 6,045,661 A | 4/2000 | Kreischer | |
| 6,281,300 B1 | 8/2001 | Kendrick | |
| 6,376,622 B1 | 4/2002 | Hucul | |
| 6,706,857 B2 | 3/2004 | Golden | |
| 7,241,859 B2 | 7/2007 | Marissal | |
| 7,402,635 B2 | 7/2008 | Noll | |
| 7,524,904 B2 | 4/2009 | Verser | |
| 7,581,458 B2 | 9/2009 | Brone | |
| 7,582,710 B2 | 9/2009 | Bell | |
| 7,776,998 B2 | 8/2010 | Cousin | |
| 7,790,842 B2 | 9/2010 | Cousin | |
| 7,957,947 B2 | 6/2011 | Odi | |
| 8,211,988 B2 | 7/2012 | Mcdaniel | |
| 8,249,748 B2 | 8/2012 | Odi | |
| 8,314,197 B2 | 11/2012 | Chamayou | |
| 8,636,831 B2 | 1/2014 | Van Der Schrick | |
| 10,035,864 B2 * | 7/2018 | Sandell | C08F 2/01 |
| 10,730,032 B2 * | 8/2020 | Dooley | C08F 110/02 |
| 2003/0176636 A1 | 9/2003 | Liesenfelder | |
| 2004/0242810 A1 | 12/2004 | Bell | |
| 2010/0004408 A1 * | 1/2010 | Baita | B29B 9/16 526/71 |
| 2011/0290726 A1 | 12/2011 | Liu | |
| 2012/0264911 A1 | 10/2012 | Mills | |
| 2012/0282144 A1 | 11/2012 | Odi | |
| 2013/0079476 A1 | 3/2013 | Chamayou | |

FOREIGN PATENT DOCUMENTS

| | | |
|---|---|---|
| EP | 0047077 B1 | 2/1986 |
| EP | 0801081 B1 | 11/2002 |
| GB | 1072624 A | 6/1967 |
| GB | 1272778 A | 5/1972 |
| GB | 1457032 A | 12/1976 |
| WO | 2017078843 A1 | 5/2017 |

OTHER PUBLICATIONS

International Search Report and Written Opinion issued in corresponding application No. PCT/US2019/031225 dated Jun. 28, 2019, 10 pages.

Lin Daigui, et al., "Direct Concentration and Drying of Polymer Solution," China Synthetic Rubber Industry, vol. 6, Dec. 27, 1993, pp. 48-53.

Search Report issued in corresponding CN Application No. 2019800277250 dated Aug. 2, 2021, 3 pgs.

* cited by examiner

US 11,173,468 B2

POLYMER FLAKE DEGASSING SYSTEM AND METHODS

CROSS-REFERENCE TO RELATED APPLICATIONS

This application is a continuation of U.S. patent application Ser. No. 15/981,532 filed on May 16, 2018, now issued as U.S. Pat. No. 10,730,032, which is incorporated herein in its entirety by reference.

TECHNICAL FIELD OF THE DISCLOSURE

This application relates to systems and processes for degassing of solid polymer flake.

BACKGROUND

Production of solid polymer flake in a fluid requires downstream separation of the fluid from the polymer flake. Polymer degassing systems are known, but typically require the use of high volumes of nitrogen to remove the fluid, for example, hydrocarbons, from the solid polymer flake. Nitrogen gas quickly becomes saturated with hydrocarbons, which are typically a major component of the fluid in which the solid polymer flake is entrained. Because nitrogen becomes saturated so quickly, large volumes of nitrogen gas are required to effectively remove the fluid from the solid polymer flake. Further, additional separation processes are typically needed to separate the fluid from the nitrogen gas, so that the separated nitrogen and fluid can be recycled to the polymer production process. These processes add significant additional cost and complexity to the process.

Accordingly, improved systems and methods for improved polymer degassing are needed.

SUMMARY

This summary is provided to introduce various concepts in a simplified form that are further described below in the detailed description. This summary is not intended to identify required or essential features of the claimed subject matter nor is the summary intended to limit the scope of the claimed subject matter.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

In one aspect, a system for polymerizing one or more olefin monomers is provided, the system including: a polymerization reactor configured to polymerize one or more olefin monomers and produce a product stream including solid polymer flake entrained in a fluid; a flash chamber configured to separate the solid polymer flake from the fluid and to produce a fluid stream and a concentrated stream, wherein the fluid stream includes the solid polymer flake in a lower concentration than in the product stream and the concentrated stream includes the solid polymer flake in a higher concentration than in the product stream; a first degassing chamber configured to separate the concentrated stream by contacting the concentrated stream with a purge fluid including one or more light hydrocarbons to produce a partially degassed polymer flake stream and a purge fluid stream, wherein the partially degassed polymer flake stream includes the fluid in a lower concentration than in the concentrated stream and the purge fluid stream includes the solid polymer flake in a lower concentration than in the concentrated stream.

In another aspect, a process for polymerizing one or more olefin monomers is provided, the process including: polymerizing one or more olefin monomers in a polymerization reactor to form a product stream including solid polymer flake entrained in a fluid; passing the product stream to a flash chamber to produce a fluid stream and a concentrated stream of polymer flake entrained in the fluid, wherein the fluid stream includes the solid polymer flake in a lower concentration than in the product stream and the concentrated stream includes the solid polymer flake in a higher concentration than in the product stream; passing the concentrated stream to a first degassing chamber, wherein a first purge fluid including one or more light hydrocarbons contacts the concentrated stream to produce a partially degassed polymer flake stream and a purge fluid stream wherein the partially degassed polymer flake stream includes the fluid in a lower concentration than in the concentrated stream and the purge fluid stream comprises the solid polymer flake in a lower concentration than in the concentrated stream.

These and other aspects and aspects according to this disclosure are provided in the drawings, detailed description and claims.

BRIEF DESCRIPTION OF THE DRAWINGS

The following figures form part of the present specification and are included to further demonstrate certain aspects of the present disclosure. The invention may be better understood by reference to one or more of these figures in combination with the detailed description of specific aspects presented herein.

DEFINITIONS

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs, and unless otherwise indicated or the context requires otherwise, these definitions are applicable throughout this disclosure. Further, unless otherwise required by context, singular terms shall include pluralities and plural terms shall include the singular. For example, if a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Unless explicitly stated otherwise in defined circumstances, all percentages, parts, ratios, and like amounts used herein are defined by weight.

Further, in this connection, certain features of the invention which are, for clarity, described herein in the context of separate aspects, may also be provided in combination in a single aspect. Conversely, various features of the invention that are, for brevity, described in the context of a single aspect, may also be provided separately or in any subcombination.

Regarding claim transitional terms or phrases, the transitional term "comprising", which is synonymous with "including", "containing", or "characterized by" is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to the feature class to which is utilized and it is possible to have different transitional terms or phrases utilized with different features within a claim. For example, a method can comprise several recited steps (and other non-recited steps) but utilize a catalyst system preparation consisting of specific steps and utilize a catalyst system comprising recited components and other non-recited components. While compositions and methods are described in terms of "comprising" various components or steps, the compositions and methods can also "consist essentially of" or "consist of" the various components or steps.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

"Optional" or "optionally" means that the subsequently described event or circumstance can or cannot occur, and that the description includes instances where the event or circumstance occurs and instances where it does not.

As used herein, "light hydrocarbons" is used to refer to hydrocarbons having 3 or fewer carbon atoms, and hydrocarbons which are gases at 1 atm and 70° F. For example, "light hydrocarbons" include methane, ethane, ethylene, propane, isopropane, propylene, isopropylene, and the like.

As used herein, "heavy hydrocarbons" is used to refer to hydrocarbons having 4 or more carbon atoms. For example, "heavy hydrocarbons" include butane, isobutene, butene, pentane, pentene, hexane, hexane, cyclohexane, octane, octane, benzene, styrene, and the like. Throughout this specification, "heavy hydrocarbons" may be abbreviated "HHC."

As used herein, "interstitial gas" is used to refer to the gas between polymer flake particles in a partially degassed stream, a completely degassed stream, or a settled sample of solid polymer flake.

As used herein, "solid polymer flake" is used to refer to polymer flake which has a solid exterior, regardless of whether the interior of the polymer flake is a solid or fluid. By "solid exterior," it is intended to reflect that the polymer flake maintains its shape in the process conditions.

As used herein, "degassing" is used broadly to refer to the process of removing a fluid from solid polymer flake or separating a fluid from solid polymer flake, regardless of whether the fluid is a liquid or a gas.

As used herein, "minimum fluidization velocity" is used broadly to refer to the minimum velocity of a fluid necessary to fluidize solid particles.

The terms "configured for use" or "adapted for use" and similar language is used herein to reflect that the particular recited structure or procedure is used in a system or process as disclosed herein. For example, unless otherwise specified, a particular structure "configured for use" means it is "configured for use in a reactor system", including for example, "configured for use in an olefin polymerization reactor system" and therefore is designed, shaped, arranged, constructed, and/or tailored to effect olefin polymerization, as would have been understood by the skilled person.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, or within 5% of the reported numerical value, or within 2% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial aspect of the inventions are described or shown for the sake of clarity and understanding. Persons of skill in this art will also appreciate that the development of an actual commercial aspect incorporating aspects of the present inventions will require numerous implementation-specific decisions to achieve the developer's ultimate goal for the commercial aspect. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Systems and Processes for Polymerizing Olefins

Systems for polymerizing one or more olefin monomers are provided herein. In some aspects, the system includes a polymerization reactor configured to polymerize one or more olefin monomers and produce a product stream comprising solid polymer flake entrained in a fluid. For example, in some aspects the polymerization reactor is a fluidized bed reactor. In some aspects, the polymerization reactor is an autoclave reactor. In some aspects, the polymerization is a tubular reactor.

Processes for polymerizing one or more olefin monomers are provided herein. In some aspects, the process includes polymerizing one or more olefin monomers in a polymerization reactor to form a product stream comprising solid polymer flake entrained in a fluid. For example, in some aspects the polymerization reactor is a fluidized bed reactor. In some aspects, the polymerization reactor is an autoclave reactor. In some aspects, the polymerization is a tubular reactor.

In some aspects, the solid polymer flake exiting the polymerization reactor is at a temperature of from about 150° F. to about 190° F., for example about 150° F., about 155° F., about 160° F., about 165° F., about 170° F., about 175° F., about 180° F., about 185° F., about 190° F., or any ranges therebetween. In some aspects, the maximum temperature of the solid polymer flake is the melting point of the solid polymer flake. In some aspects, the maximum temperature of the solid polymer flake is the minimum sintering temperature of the solid polymer flake. In some aspects, the solid polymer flake is at a temperature which is from about 15° C. to about 40° C. lower than the melting temperature of the solid polymer flake, for example about 15° C. lower, about 20° C. lower, about 25° C. lower, about 30° C. lower, about 35° C. lower, about 40° C. lower, or any ranges therebetween.

In some aspects, the one or more olefins include ethylene and the polymer flake includes polyethylene. In some aspects, the one or more olefins include propylene and the polymer flake includes polypropylene. In some aspects, the one or more olefins include ethylene and propylene and the polymer flake includes a co-polymer of ethylene and propylene. In some aspects, the one or more olefins include ethylene and 1-butene and the polymer flake includes a co-polymer of ethylene and 1-butene. In some aspects, the one or more olefins include ethylene and 1-hexene, and the polymer flake includes a co-polymer of ethylene and 1-hexene. In some aspects, the one or more olefins include ethylene and 1-octene, and the polymer flake includes a co-polymer of ethylene and 1-octene. In some aspects, the one or more olefins include pentene and the polymer flake includes polypentene. In some aspects, the one or more olefins include three of propylene, ethylene, 1-butene, 1-hexene, and 1-octene, and the polymer flake includes a terpolymer.

In some aspects, the polymerization reactor is configured to polymerize the one or more olefins in the presence of one or more heavy hydrocarbons. In some aspects, the one or more heavy hydrocarbons include butane, isobutane, pentane, hexane, octane, or any combinations thereof. For example, the polymerization reactor may be configured to polymerize the one or more olefins to form a copolymer of the one or more olefins and the one or more heavy hydrocarbons. In some aspects, the one or more olefins include ethylene and 1-butene and the polymer flake includes a co-polymer of ethylene and 1-butene. In some aspects, the one or more olefins include ethylene and pentene and the polymer flake includes a co-polymer of ethylene and pentene. In some aspects, the one or more olefins include ethylene and 1-hexene, and the polymer flake includes a co-polymer of ethylene and 1-hexene. In some aspects, the one or more olefins include ethylene and 1-octene, and the polymer flake includes a co-polymer of ethylene and 1-octene.

In some aspects, the system further includes a flash chamber configured to separate the solid polymer flake from the fluid and to produce a fluid stream and a concentrated stream. The fluid stream includes the solid polymer flake in a lower concentration than in the product stream and the concentrated stream includes the solid polymer flake in a higher concentration than in the product stream. For example, in some aspects the fluid stream contains less than about 5 wt. % solid polymer flake, less than about 1 wt. % solid polymer flake, less than about 0.1 wt. % solid polymer flake, for example about 5 wt. % solid polymer flake, about 4 wt. % solid polymer flake, about 3 wt. % solid polymer flake, about 2 wt. % solid polymer flake, about 1 wt. % solid polymer flake, about 0.9 wt. % solid polymer flake, about 0.8 wt. % solid polymer flake, about 0.7 wt. % solid polymer flake, about 0.6 wt. % solid polymer flake, about 0.5 wt. % solid polymer flake, about 0.4 wt. % solid polymer flake, about 0.3 wt. % solid polymer flake, about 0.2 wt. % solid polymer flake, about 0.1 wt. % solid polymer flake, about 0.09 wt. % solid polymer flake, about 0.08 wt. % solid polymer flake, about 0.07 wt. % solid polymer flake, about 0.06 wt. % solid polymer flake, about 0.05 wt. % solid polymer flake, about 0.04 wt. % solid polymer flake, about 0.03 wt. % solid polymer flake, about 0.02 wt. % solid polymer flake, about 0.01 wt. % solid polymer flake, and any ranges therebetween. In some aspects, the concentrated stream contains more than about 80 wt. % solid polymer flake, more than about 90 wt. % solid polymer flake, or more than about 95 wt. % solid polymer flake, for example about 80 wt. % solid polymer flake, about 81 wt. % solid polymer flake, about 82 wt. % solid polymer flake, about 83 wt. % solid polymer flake, about 84 wt. % solid polymer flake, about 85 wt. % solid polymer flake, about 86 wt. % solid polymer flake, about 87 wt. % solid polymer flake, about 88 wt. % solid polymer flake, about 89 wt. % solid polymer flake, about 90 wt. % solid polymer flake, about 91 wt. % solid polymer flake, about 92 wt. % solid polymer flake, about 93 wt. % solid polymer flake, about 94 wt. % solid polymer flake, about 95 wt. % solid polymer flake, about 96 wt. % solid polymer flake, about 97 wt. % solid polymer flake, about 98 wt. % solid polymer flake, about 99 wt. % solid polymer flake, and any ranges therebetween. In some aspects, the fluid is a liquid and the product stream contains from about 30 wt. % solid polymer flake to about 50 wt. % solid polymer flake, for example about 30 wt. % solid polymer flake, about 35 wt. % solid polymer flake, about 40 wt. % solid polymer flake, about 45 wt. % solid polymer flake, about 50 wt. % solid polymer flake, or any ranges therebetween. In some aspects, the fluid is a gas and the product stream contains from about 75 wt. % solid polymer flake to about 95 wt. % polymer flake, for example about 75 wt. % solid polymer flake, about 80 wt. % solid polymer flake, about 85 wt. % solid polymer flake, about 90 wt. % solid polymer flake, about 95 wt. % solid polymer flake, and any ranges therebetween. When determining the weight percent of a stream which is solid polymer flake or fluid as described herein, any fluid adsorbed to the solid polymer flake is considered fluid weight, rather than solid polymer flake weight. In some aspects, the fluid stream includes a mixture of gas and liquid. In some aspects, the fluid stream is a gas. In some aspects, the fluid stream is a liquid. In some aspects, the fluid comprises at least one of the one or more olefin monomers. In some aspects, the fluid is a gas. In some aspects, the fluid is a liquid. In some aspects, the polymerization reactor is a gas phase reactor. In some aspects, the polymerization reactor is a liquid phase reactor, for example a loop slurry reactor or an autoclave reactor.

In some aspects, the process further includes passing the product stream to a flash chamber to produce a fluid stream and a concentrated stream of polymer flake entrained in the fluid. In some aspects, the fluid stream includes the solid polymer flake in a lower concentration than in the product stream and the concentrated stream includes the solid polymer flake in a higher concentration than in the product stream. For example, in some aspects the fluid stream contains less than about 5 wt. % solid polymer flake, less than about 1 wt. % solid polymer flake, less than about 0.1 wt. % solid polymer flake, for example about 5 wt. % solid polymer flake, about 4 wt. % solid polymer flake, about 3 wt. % solid polymer flake, about 2 wt. % solid polymer flake, about 1 wt. % solid polymer flake, about 0.9 wt. % solid polymer flake, about 0.8 wt. % solid polymer flake, about 0.7 wt. % solid polymer flake, about 0.6 wt. % solid polymer flake, about 0.5 wt. % solid polymer flake, about 0.4 wt. % solid polymer flake, about 0.3 wt. % solid polymer flake, about 0.2 wt. % solid polymer flake, about 0.1 wt. % solid polymer flake, about 0.09 wt. % solid polymer flake, about 0.08 wt. % solid polymer flake, about 0.07 wt. % solid polymer flake, about 0.06 wt. % solid polymer flake, about 0.05 wt. % solid polymer flake, about 0.04 wt. % solid polymer flake, about 0.03 wt. % solid polymer flake, about 0.02 wt. % solid polymer flake, about 0.01 wt. % solid polymer flake, and any ranges therebetween. In some aspects, the concentrated stream contains more than about 80 wt. % solid polymer flake, more than about 90 wt. % solid polymer flake, or more than about 95 wt. % solid polymer flake, for example about 80 wt. % solid polymer flake, about 81 wt. % solid polymer flake, about 82 wt. % solid polymer flake, about 83 wt. % solid polymer flake, about 84 wt. % solid polymer flake, about 85 wt. % solid polymer flake, about 86 wt. % solid polymer flake, about 87 wt. % solid polymer flake, about 88 wt. % solid polymer flake, about 89 wt. % solid polymer flake, about 90 wt. % solid polymer flake, about 91 wt. % solid polymer flake, about 92 wt. % solid polymer flake, about 93 wt. % solid polymer flake, about 94 wt. % solid polymer flake, about 95 wt. % solid polymer flake, about 96 wt. % solid polymer flake, about 97 wt. % solid polymer flake, about 98 wt. % solid polymer flake, about 99 wt. % solid polymer flake, and any ranges therebetween. In some aspects, the fluid is a liquid and the product stream contains from about 30 wt. % solid polymer flake to about 50 wt. % solid polymer flake, for example about 30 wt. % solid polymer flake, about 35 wt. % solid polymer flake, about 40 wt. % solid polymer flake, about 45 wt. % solid polymer flake, about 50 wt. % solid polymer flake, or any ranges therebetween. In some aspects, the fluid is a gas and the product stream contains from about 75 wt. % solid polymer flake to about 95 wt. % polymer flake, for example about 75 wt. % solid polymer flake, about 80 wt. % solid polymer flake, about 85 wt. % solid polymer flake, about 90 wt. % solid polymer flake, about 95 wt. % solid polymer flake, and any ranges therebetween. When determining the weight percent of a stream which is solid polymer flake or fluid as described herein, any fluid adsorbed to the solid polymer flake is considered fluid weight, rather than solid polymer flake weight. In some aspects, the fluid stream includes a mixture of gas and liquid. In some aspects, the fluid stream is a gas. In some aspects, the fluid stream is a liquid. In some aspects, the fluid comprises at least one of the one or more olefin monomers. In some aspects, the fluid is a gas. In some aspects, the fluid is a liquid. In some aspects, the polymerization reactor is a gas phase reactor. In some aspects, the polymerization reactor is a liquid phase reactor, for example a loop slurry reactor or an autoclave reactor.

In some aspects, the system further includes a first degassing chamber configured to separate the concentrated stream by contacting the concentrated stream with a purge fluid comprising one or more light hydrocarbons to produce a partially degassed polymer flake stream and a purge fluid stream. The partially degassed polymer flake stream includes the fluid in a lower concentration than in the concentrated stream and the purge fluid stream includes the solid polymer flake in a lower concentration than in the concentrated stream. In some aspects, the partially degassed polymer flake stream contains less than 1 wt. % fluid, less than about 0.1 wt. % fluid, or less than about 0.01 wt. % fluid, for example about 1 wt. % fluid, about 0.9 wt. % fluid, about 0.8 wt. % fluid, about 0.7 wt. % fluid, about 0.6 wt. % fluid, about 0.5 wt. % fluid, about 0.4 wt. % fluid, about 0.3 wt. % fluid, about 0.2 wt. % fluid, about 0.1 wt. % fluid, about 0.09 wt. % fluid, about 0.08 wt. % fluid, about 0.07 wt. % fluid, about 0.06 wt. % fluid, about 0.05 wt. % fluid, about 0.04 wt. % fluid, about 0.03 wt. % fluid, about 0.02 wt. % fluid, about 0.01 wt. % fluid, or any ranges therebetween. In some aspects, the purge fluid stream contains less than 1 wt. % solid polymer flake, or less than 0.1 wt. % solid polymer flake, for example about 1 wt. % solid polymer flake, about 0.9 wt. % solid polymer flake, about 0.8 wt. % solid polymer flake, about 0.7 wt. % solid polymer flake, about 0.6 wt. % solid polymer flake, about 0.5 wt. % solid polymer flake, about 0.4 wt. % solid polymer flake, about 0.3 wt. % solid polymer flake, about 0.2 wt. % solid polymer flake, about 0.1 wt. % solid polymer flake, about 0.09 wt. % solid polymer flake, about 0.08 wt. % solid polymer flake, about 0.07 wt. % solid polymer flake, about 0.06 wt. % solid polymer flake, about 0.05 wt. % solid polymer flake, about 0.04 wt. % solid polymer flake, about 0.03 wt. % solid polymer flake, about 0.02 wt. % solid polymer flake, about 0.01 wt. % solid polymer flake, or any ranges therebetween. In some aspects, the purge fluid stream contains at least 0.1 wt. % fluid or at least 1 wt. % fluid, for example about 0.1 wt. % fluid, about 0.5 wt. % fluid, about 1 wt. % fluid, about 5 wt. % fluid, about 10 wt. % fluid, about 15 wt. % fluid, about 20 wt. % fluid, or any ranges therebetween. In some aspects, the weight ratio of purge fluid to polymer flake in the concentrated stream is from about 0.005 to about 1, for example about 0.005, about 0.01, about 0.02, about 0.05, about 0.1, about 0.3, about 0.4, about 0.5, about 0.6, about 0.7, about 0.8, about 0.9, about 1, or any ranges therebetween.

In some aspects, the process further includes passing the concentrated stream to a first degassing chamber, wherein a first purge fluid including one or more light hydrocarbons contacts the concentrated stream to produce a partially degassed polymer flake stream and a purge fluid stream. The partially degassed polymer flake stream includes the fluid in a lower concentration than in the concentrated stream and the purge fluid stream includes the solid polymer flake in a lower concentration than in the concentrated stream. In some aspects, the partially degassed polymer flake stream contains less than 1 wt. % fluid, less than about 0.1 wt. % fluid, or less than about 0.01 wt. % fluid, for example about 1 wt. % fluid, about 0.9 wt. % fluid, about 0.8 wt. % fluid, about 0.7 wt. % fluid, about 0.6 wt. % fluid, about 0.5 wt. % fluid, about 0.4 wt. % fluid, about 0.3 wt. % fluid, about 0.2 wt. % fluid, about 0.1 wt. % fluid, about 0.09 wt. % fluid, about 0.08 wt. % fluid, about 0.07 wt. % fluid, about 0.06 wt. % fluid, about 0.05 wt. % fluid, about 0.04 wt. % fluid, about 0.03 wt. % fluid, about 0.02 wt. % fluid, about 0.01 wt. % fluid, or any ranges therebetween. In some aspects, the purge fluid stream contains less than 1 wt. % solid polymer flake, or less than 0.1 wt. % solid polymer flake, for example about 1 wt. % solid polymer flake, about 0.9 wt. % solid polymer flake, about 0.8 wt. % solid polymer flake, about 0.7 wt. % solid polymer flake, about 0.6 wt. % solid polymer flake, about 0.5 wt. % solid polymer flake, about 0.4 wt. % solid polymer flake, about 0.3 wt. % solid polymer flake, about 0.2 wt. % solid polymer flake, about 0.1 wt. % solid polymer flake, about 0.09 wt. % solid polymer flake, about 0.08 wt. % solid polymer flake, about 0.07 wt. % solid polymer flake, about 0.06 wt. % solid polymer flake, about 0.05 wt. % solid polymer flake, about 0.04 wt. % solid polymer flake, about 0.03 wt. % solid polymer flake, about 0.02 wt. % solid polymer flake, about 0.01 wt. % solid polymer flake, or any ranges therebetween. In some aspects, the purge fluid stream contains at least 0.1 wt. % fluid or at least 1 wt. % fluid, for example about 0.1 wt. % fluid, about 0.5 wt. % fluid, about 1 wt. % fluid, about 5 wt. % fluid, about 10 wt. % fluid, about 15 wt. % fluid, about 20 wt. % fluid, or any ranges therebetween. In some aspects, the weight ratio of purge fluid to polymer flake in the concentrated stream is from about 0.005 to about 1, for example about 0.005, about 0.01, about 0.02, about 0.05, about 0.1, 0.3, about 0.4, about 0.5, about 0.6, about 0.7, about 0.8, about 0.9, about 1, or any ranges therebetween.

In some aspects, the first degassing chamber has a residence time of from about 30 minutes to about 180 minutes, for example about 30 minutes, about 40 minutes, about 50 minutes, about 60 minutes, about 70 minutes, about 80 minutes, about 90 minutes, about 100 minutes, about 110 minutes, about 120 minutes, about 130 minutes, about 140 minutes, about 150 minutes, about 160 minutes, about 170 minutes, about 180 minutes, or any ranges therebetween. For example, in some aspects, the first degassing chamber has a residence time of from about 30 minutes to about 60 minutes, or from about 35 minutes to about 50 minutes.

In some aspects, the purge fluid is heated before being introduced into the first degassing chamber. However, without intending to be bound by any particular theory, it is believed that heating the purge fluid is not required. Specifically, it is believed that the higher specific heat of the purge fluid compared to pure nitrogen fluid allows for effective degassing of the solid polymer flake without preheating of the purge fluid.

In some aspects, the first degassing chamber is at about 0 psig. Without intending to be bound by any particular theory, it is believed that a pressure at about vacuum improves equilibrium at the same mass stripping rate as compared to a first degassing chamber at a pressure above vacuum. In some aspects, the pressure within the first degassing chamber is from about 1 psig to about 10 psig, for example about 1 psig, about 2 psig, about 3 psig, about 4 psig, about 5 psig, about 6 psig, about 7 psig, about 8 psig, about 9 psig, about 10 psig, and any ranges therebetween. In some aspects, the first degassing chamber is from about 150 psig to about 300 psig, for example about 150 psig, about 160 psig, about 170 psig, about 180 psig, about 190 psig, about 200 psig, about 210 psig, about 220 psig, about 230 psig, about 240 psig, about 250 psig, about 260 psig, about 270 psig, about 280 psig, about 290 psig, about 300 psig, or any ranges therebetween. Without intending to be bound by any particular theory, it is believed that a first degassing chamber at a higher pressure may result in less energy being required to pump the purge stream back to the polymerization reactor.

In some aspects, the first degassing chamber is operated so that the concentration of heavy hydrocarbons (HHC) in the purge fluid leaving the first degassing chamber does not reach equilibrium with the concentrated stream of polymer flake entering the first degassing chamber. As used herein, a "G/P ratio" is used to refer to the mass flow rate of purge gas stream fed to the first degassing chamber (G) divided by the mass flow rate of the concentrated stream of polymer flake (P).

While not intending to be bound by any particular theory, in some aspects, the minimum G/P ratio in the first degassing chamber is the G/P ratio at which the HHC concentration in the purge stream leaving the purge column has increased to the point that it is in equilibrium with the concentrated stream at the HHC concentration of the concentrated steam and at the conditions (temperature and pressure) of the first degassing chamber. Operating the first degassing chamber at above the minimum G/P ratio assures that equilibrium between the purge stream and the solid polymer flake continually decreases the HHC concentration at the surface of the solid polymer flake as the solid polymer flake progresses through the first degassing chamber. The minimum G/P ratio can be estimated by the following formula:

$$\frac{\left\{\frac{(HHC)_{in}}{[E]_{in}} - (HHC)_{in}\right\} * D_g}{P} = \left(\text{minimum} \frac{G}{P} \text{ratio}\right)$$

wherein $HHC_{in}$ is the volume rate at which the one or more heavy hydrocarbons are fed to the first degassing chamber (ft³ per minute) from all streams (including both the concentrated polymer flake stream and purge fluid stream), $[E]_{in}$ is the molar concentration of one or more HHC's in the purge fluid leaving the first degassing stream that would be in equilibrium with the concentrated polymer flake stream, $D_g$ is the density of the purge fluid stream at the conditions of the first degassing chamber, and P is the mass rate of the concentrated polymer flake stream. In some aspects, the first degassing chamber is operated at a G/P ratio of between 1 and 2 times the minimum G/P ratio.

In some aspects, the first degassing chamber is operated at a G/P ratio of at least 2 times the minimum G/P ratio. For example, in some aspects, the first degassing chamber is operated at a G/P ratio of about 2 times the minimum, about 3 times the minimum, about 4 times the minimum, about 5 times the minimum, about 6 times the minimum, about 7 times the minimum, about 8 times the minimum, about 9 times the minimum, about 10 times the minimum, or any ranges therebetween. Without intending to be bound by any particular theory, it is believed that G/P ratios of less than 2 require increased residence time and vessel size of the first degassing chamber. Without intending to be bound by any particular theory, it is believed that G/P ratios of more than 4 or 5 times the minimum G/P ratio may require higher purge fluid stream rates, without significantly decreasing the required residence time or vessel size.

Without intending to be bound by any particular theory, it is believed that the chamber size of the first degassing chamber may be minimized by operating at from about 2 to about 5 times the minimum G/P ratio. Without intending to be bound by any particular theory, it is believed that operating the first degassing chamber at from about 2 to about 5 times the minimum G/P ratio may allow a particular HHC concentration to be reached in the partially degassed stream within between 1.5 and 4 times the minimum residence time. Without intending to be bound by any particular theory, it is believed that, as the G/P ratio approaches the minimum G/P ratio, the residence time required to achieve a particular HHC concentration in the partially degassed stream can become infinitely large.

In some aspects, the first degassing chamber is substantially cylindrical, and has a ratio of length to diameter of from about 4:1 to 8:1. In some aspects, the inner diameter of the first degassing chamber is from about 5 feet to about 6 feet. In some aspects, the concentrated stream flows through the degassing chamber in plug flow. In some aspects, the superficial velocity of the purge gas entering the first degassing chamber is about 90% or less of the minimum fluidization velocity, for example about 90% of the minimum fluidization velocity, about 80% of the minimum fluidization velocity, about 70% of the minimum fluidization velocity, about 60% of the minimum fluidization velocity, about 50% of the minimum fluidization velocity, about 40% of the minimum fluidization velocity, about 30% of the minimum fluidization velocity, about 20% of the minimum fluidization velocity, about 10% of the minimum fluidization velocity, or any ranges therebetween.

In some aspects, the purge fluid is added to the first degassing chamber at a point which is less than about 20% along the length of the first degassing chamber, in the direction of the flow of the purge fluid, for example at a point which is about 19% along the length of the first degassing chamber, about 15% along the length of the first degassing chamber, about 10% along the length of the first degassing chamber, about 5% along the length of the first degassing chamber, about 0% along the length of the first degassing chamber, or any ranges therebetween.

In some aspects, the flash chamber and the first degassing chamber are both within a single piece of equipment. For example, in some aspects, the flash chamber may be located at one end of or above a plug flow bed of polymer flake, and the degassing chamber may be the remainder of the plug flow bed.

In some aspects, the purge fluid stream is recycled to the polymerization reactor. In some aspects, the purge fluid stream is recycled to the polymerization reactor without further separation or purification steps. In some aspects, the purge fluid is added to the first degassing chamber at more than one location along the first degassing chamber.

In some aspects, the system further includes a second degassing chamber configured to produce a fully degassed polymer flake stream by contacting the partially degassed polymer flake stream with a second purge stream comprising nitrogen to produce the fully degassed polymer flake stream and a used nitrogen stream. The fully degassed polymer flake stream includes the fluid and light hydrocarbons at a lower concentration than in the partially degassed polymer flake stream and the used nitrogen stream includes the heavy and light hydrocarbons from the partially degassed stream at a concentration greater than the second purge stream. In some aspects, the fully degassed polymer flake stream includes light and heavy hydrocarbons at less than 100 ppmw (parts per million by weight), less than 20 ppmw, less than 10 ppmw, or less than 5 ppmw, for example about 100 ppmw, about 90 ppmw, about 80 ppmw, about 70 ppmw, about 60 ppmw, about 50 ppmw, about 40 ppmw, about 30 ppmw, about 20 ppmw, about 15 ppmw, about 10 ppmw, about 9 ppmw, about 8 ppmw, about 7 ppmw, about 6 ppmw, about 5 ppmw, about 4 ppmw, about 3 ppmw, about 2 ppmw, about 1 ppmw, or any ranges therebetween. In some aspects, the fully degassed polymer flake stream in stagnant air will generate a hydrocarbon concentration of less than 50% LEL (lower explosive limit), less than 20% LEL, or less than 10% LEL, for example about 50% LEL, about 45% LEL, about 40% LEL, about 35% LEL, about 30% LEL, about 25% LEL, about 20% LEL, about 15% LEL, about 10% LEL, about 9% LEL, about 8% LEL, about 7% LEL, about 6% LEL, about 5% LEL, about 4% LEL, about 3% LEL, about 2% LEL, about 1% LEL, or any ranges therebetween. In some aspects, the weight ratio of the second purge fluid to the polymer flake in the partially degassed stream is from about 0.001 to about 0.03, for example about 0.001, about 0.005, about 0.01, about 0.02, about 0.025, about 0.03, or any ranges therebetween.

In some aspects, the process further includes passing the partially degassed polymer flake stream to a second degassing chamber, wherein a second purge fluid including nitrogen contacts the partially degassed polymer flake stream to produce a fully degassed polymer flake stream and a used nitrogen stream. The fully degassed polymer flake stream includes the fluid and light hydrocarbons at a lower concentration than in the partially degassed polymer flake stream and the used nitrogen stream includes the heavy and light hydrocarbons from the partially degassed stream at a concentration greater than the second purge stream In some aspects, the fully degassed polymer flake stream includes light and heavy hydrocarbons at less than 100 ppmw, less than 20 ppmw, less than 10 ppmw, or less than 5 ppmw, for example about 100 ppmw, about 90 ppmw, about 80 ppmw, about 70 ppmw, about 60 ppmw, about 50 ppmw, about 40 ppmw, about 30 ppmw, about 20 ppmw, about 15 ppmw, about 10 ppmw, about 9 ppmw, about 8 ppmw, about 7 ppmw, about 6 ppmw, about 5 ppmw, about 4 ppmw, about 3 ppmw, about 2 ppmw, about 1 ppmw, or any ranges therebetween. In some aspects, the fully degassed polymer flake stream in stagnant air will generate a hydrocarbon concentration of less than 50% LEL, less than 20% LEL, or less than 10% LEL, for example about 50% LEL, about 45% LEL, about 40% LEL, about 35% LEL, about 30% LEL, about 25% LEL, about 20% LEL, about 15% LEL, about 10% LEL, about 9% LEL, about 8% LEL, about 7% LEL, about 6% LEL, about 5% LEL, about 4% LEL, about 3% LEL, about 2% LEL, about 1% LEL, or any ranges therebetween. In some aspects, the weight ratio of the second purge fluid to the polymer flake in the partially degassed stream is from about 0.001 to about 0.03, for example about 0.001, about 0.005, about 0.01, about 0.02, about 0.025, about 0.03, or any ranges therebetween. In some aspects, the second degassing chamber has a residence time of from about 5 minutes to about 180 minutes, for example about 5 minutes, about 10 minutes, about 20 minutes, about 30 minutes, about 40 minutes, about 50 minutes, about 60 minutes, about 70 minutes, about 80 minutes, about 90 minutes, about 100 minutes, about 110 minutes, about 120 minutes, about 130 minutes, about 140 minutes, about 150 minutes, about 160 minutes, about 170 minutes, about 180 minutes, or any ranges therebetween. For example, in some aspects, the second degassing chamber has a residence time of from about 30 minutes to about 60 minutes, or from about 35 minutes to about 50 minutes. In some aspects, the second degassing chamber has a residence time of from about 5 minutes to about 15 minutes, for example about 5 minutes, about 6 minutes, about 7 minutes, about 8 minutes, about 9 minutes, about 10 minutes, about 11 minutes, about 12 minutes, about 13 minutes, about 14 minutes, about 15 minutes, or any ranges therebetween.

In some aspects, the G/P ratio of the second degassing chamber is sufficient to remove the purge fluid to a desired level. Without intending to be bound by any particular theory, it is believed that the purge fluid will be much easier to remove from the solid polymer flake than the one or more heavy hydrocarbons, since it is believed that the equilibrium between the purge fluid will favor removing the purge fluid from the solid polymer flake. While not intending to be bound by any particular theory, in some aspects, the minimum G/P ratio in the second degassing chamber is the ratio of the mass rate of interstitial gas being transferred to the second gas chamber to the weight rate of solid polymer flake being transferred to the second gas chamber. Without intending to be bound by any particular theory, it is believed that the volume rate of interstitial gas being transferred to the second degassing chamber can be calculated as follows:

$$R_{interstitial} = V_{flake} * \left(1 - \frac{SBD}{D}\right)$$

wherein $R_{interstitial}$ is the volume rate of interstitial gas, $V_{flake}$ is the volume rate of solid polymer flake being transferred to the second degassing chamber, SBD is the settled bulk density, and D is the density of the solid polymer flake. The minimum mass rate of purge fluid to the second degassing chamber is then calculated by multiplying the volume rate of interstitial gas by the density of the purge fluid at the conditions in the second degassing chamber.

In some aspects, the G/P ratio in the second degassing chamber is from about 2 times the minimum G/P ratio to about 10 times the minimum G/P ratio. In some aspects, the G/P ratio in the second degassing chamber is from about 1 times the minimum G/P ratio to about 30 times the minimum G/P ratio In some aspects, the second degassing chamber is substantially cylindrical, and has a ratio of length to diameter of from about 4:1 to 8:1. In some aspects, the inner diameter of the second degassing chamber is from about 5 feet to about 6 feet. In some aspects, the concentrated stream flows through the first degassing chamber in plug flow.

In some aspects, the superficial velocity of the second purge gas entering the second degassing chamber is about 90% or less of the minimum fluidization velocity, for example about 90% of the minimum fluidization velocity, about 80% of the minimum fluidization velocity, about 70% of the minimum fluidization velocity, about 60% of the minimum fluidization velocity, about 50% of the minimum fluidization velocity, about 40% of the minimum fluidization velocity, about 30% of the minimum fluidization velocity, about 20% of the minimum fluidization velocity, about 10% of the minimum fluidization velocity, or any ranges therebetween.

In some aspects, the first degassing chamber and the second degassing chamber have a combined residence time of from about 30 minutes to about 180 minutes, for example about 30 minutes, about 40 minutes, about 50 minutes, about 60 minutes, about 70 minutes, about 80 minutes, about 90 minutes, about 100 minutes, about 110 minutes, about 120 minutes, about 130 minutes, about 140 minutes, about 150 minutes, about 160 minutes, about 170 minutes, about 180 minutes, or any ranges therebetween. For example, in some aspects, the first degassing chamber and the second degassing chamber have a combined residence time of from about 30 minutes to about 60 minutes, or from about 35 minutes to about 50 minutes. For example, in some aspects, the first degassing chamber has a residence time of from about 10 minutes to about 170 minutes and the second degassing chamber has a residence time of from about 170 minutes to about 10 minutes.

In some aspects, the second purge fluid is added to the second degassing chamber at a point which is less than about 20% along the length of the second degassing chamber, in the direction of the flow of the second purge fluid, for example at a point which is about 19% along the length of the second degassing chamber, about 15% along the length of the second degassing chamber, about 10% along the length of the second degassing chamber, about 5% along the length of the second degassing chamber, about 0% along the length of the second degassing chamber, or any ranges therebetween.

In some aspects, the used nitrogen stream is further passed to a separation process to separate any light hydrocarbons from the used nitrogen stream and produce a purified nitrogen stream and a hydrocarbon stream. The hydrocarbon stream contains the light hydrocarbons in a concentration higher than in the used nitrogen stream, and the purified nitrogen stream contains the light hydrocarbons in a concentration lower than in the used nitrogen stream. In some aspects, the purified nitrogen is recycled to the second degassing chamber. In some aspects, the hydrocarbon stream is recycled to the polymerization reactor. In some aspects, the hydrocarbon stream is sent to a flare.

Illustrated Aspects

Figure 1:
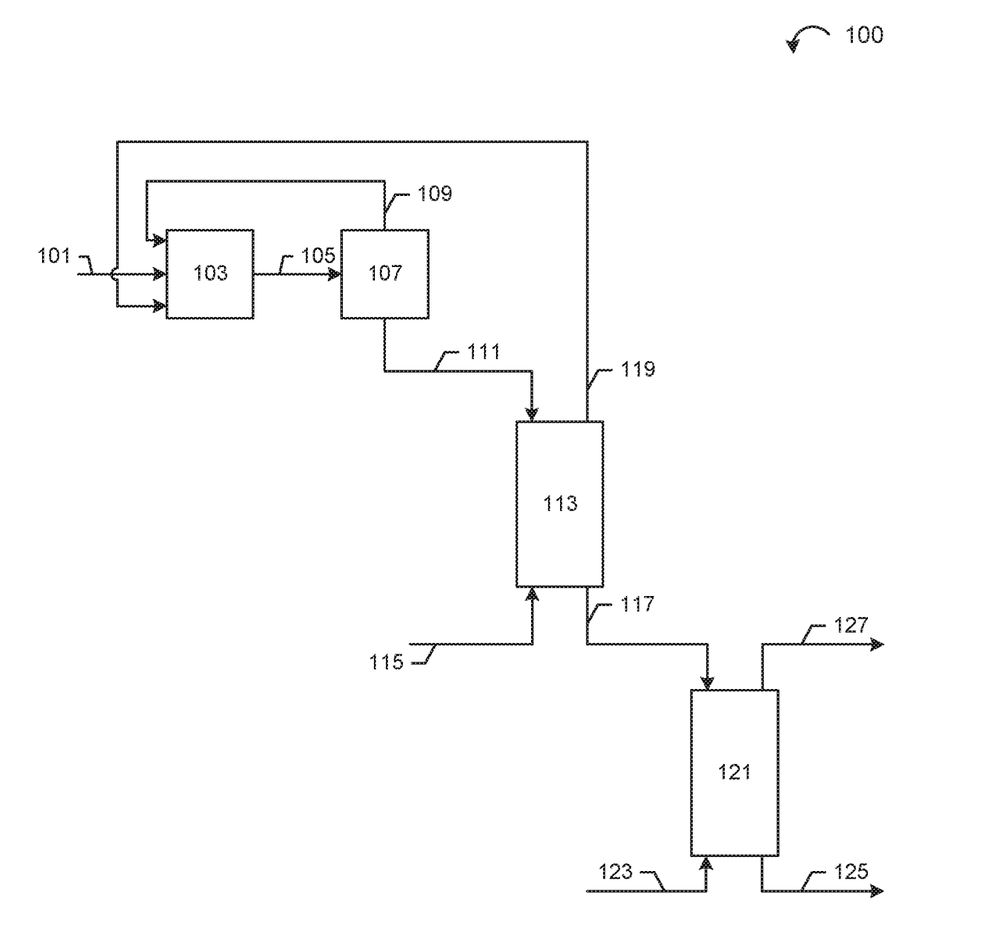
FIG. 1 is a schematic illustration of a system or process according to aspects of the present disclosure.

FIG. 1 is a schematic illustration of a system or process 100 according to aspects of the present disclosure. A reactant stream 101 is provided to a polymerization reactor 103 which produces a product stream 105 containing solid polymer flake entrained in a fluid. The product stream 105 is provided to a flash chamber 107 configured to separate the solid polymer flake from the fluid, producing a fluid stream 109 and a concentrated stream 111. The fluid stream 109 contains the solid polymer flake in a lower concentration than in the product stream 105, and the concentrated stream 111 contains the solid polymer flake in a higher concentration than in the product stream 105. Next, the concentrated stream 111 and a purge fluid 115 are fed to a first degassing chamber 113 configured to separate the concentrated stream 111 into a partially degassed stream 117 and a purge fluid stream 119. The purge fluid stream 119 contains the solid polymer flake in a lower concentration than the concentrated stream 111, and the partially degassed stream 117 contains the fluid in a lower concentration than in the concentrated stream 111. The fluid stream 109 and the purge fluid stream 119 are recycled to the polymerization reactor 103.

Next, the partially degassed stream 117 and a second purge stream 123 which includes nitrogen are fed to a second degassing chamber 121 configured to separate the partially degassed stream 117 into a fully degassed polymer flake stream 125 and a used nitrogen stream 127. The fully degassed polymer flake stream 125 includes the fluid at a lower concentration than in the partially degassed polymer flake stream 117 and the used nitrogen stream includes the solid polymer flake in a lower concentration than in the partially degassed polymer flake stream 117.

EXAMPLES

The invention is further illustrated by the following examples, which are not to be construed in any way as imposing limitations to the scope of this invention. Various other aspects, aspects, modifications, and equivalents thereof which, after reading the description herein, can suggest themselves to one of ordinary skill in the art without departing from the spirit of the present invention or the scope of the appended claims.

Prophetic Example 1

A reactant stream is provided to a gas phase polymerization reactor which produces linear low density polyethylene at a density of 0.918 g/cc. The linear low density polyethylene being produced is a copolymer of ethylene and a heavy hydrocarbon monomer, hexene. A heavy hydrocarbon diluent, n-hexane, is also present in the reactor. The polymerization reactor is being operated at 86° C. and 315 psia. The gas composition is as follows: 100 psi of ethylene, 10.5 psi of hexene-1, 8.4 psi of n-hexane, and the balance nitrogen.

A product stream containing solid polymer flakes entrained in a fluid is discharged continuously from the reactor at a rate of about 75,000 lbs/hr of solid polymer flakes. The solid polymer flakes have an average thickness of 800 microns. The product stream is provided to a flash chamber configured to separate the solid polymer flake from the fluid, producing a fluid stream and a concentrated stream. The average pressure in the flash chamber is controlled at 25 psia and the temperature is measured to be 80° C. The fluid stream contains the solid polymer flake in a lower concentration than in the product stream. The fluid stream is filtered and returned to the reactor using a compressor without further purification or treatment. The concentrated stream contains the solid polymer flake in a higher concentration than in the product stream. The concentrated stream includes approximately 1.6 wt % of heavy hydrocarbons comprised of hexene-1 and n-hexane that are absorbed into the solid polymer flake. The concentration of heavy hydrocarbons in the solid polymer flake is estimated using overall and component mass balances around different portions of the unit.

The concentrated stream of solid polymer flake is introduced into the top of a first degassing chamber. Towards the bottom of the first degassing chamber, a purge fluid consisting of purified ethylene at 80° C. is fed at a rate of 2,500 lbs/hr. The average temperature of the solids in the first degassing chamber is approximately 78° C. and the pressure is controlled at 20 psia. The level of solids in the degassing chamber is maintained such that the purge fluid permeates and rises through a bed of the solid polymer flakes. The solid polymer flakes are moving downward through the bed in plug flow pattern. The purge fluid leaves the top of the bed of solid polymer flakes and is continuously discharged from the top of the vessel. The level of solids in the first degassing chamber is controlled such that the solid polymer flakes have an average residence time that provides 40 minutes of contact with the rising purge fluid. The solid polymer flakes leave the first degassing chamber as a partially degassed stream.

The purge fluid leaving the first degassing chamber and comprised of ethylene and heavy hydrocarbons, is filtered and returned back to the reactor using a compressor. The purge fluid is returned without any further purification or treatment.

Testing indicates that at 78° C. and 20 psia, the heavy hydrocarbons in the concentrated stream from the flash chamber (1.6 wt % heavy hydrocarbons) would equilibrate with an ethylene purge fluid stream comprising approximately 24.6 vol % of the heavy hydrocarbons hexene-1 and n-hexane. The minimum G/P ratio for the first degassing chamber for the above conditions is calculated to be approximately 0.016 lb of purge gas per pound of solid polymer flake using the formula below:

$$\frac{\left\{\frac{(HHC)_{in}}{[E]_{in}} - (HHC)_{in}\right\} * D_g}{P} = \left(\text{minimum} \frac{G}{P} \text{ratio}\right)$$

$(HHC)_{in}$ is 4,839 ft³/hr, calculated as follows. 75,000 lbs/hr total fed to the first degassing chamber*0.016 lb HHC/lb solid=1,200 lbs/hr HHC fed to the first degassing chamber. 1,200 lb/hr HHC fed to the first degassing chamber/0.249 lb/ft³ (HHC density at first degassing chamber conditions)=4,839 ft³/hr. $[E]_{in}$ is 24.6 vol. %, and $D_g$ is the density of the purge fluid at first degassing chamber conditions=0.081 lb/ft³. Thus, the minimum G/P ratio={(4839/0.246)−4839}*0.081/75,000=0.016 lb purge fluid/lb solid polymer flake.

This means the minimum mass rate of purge fluid would be approximately 1,200 lbs/hr (75,000 lbs/hr*0.016 lb/lb=1,200 lbs/hr). Therefore, the first degassing chamber is operated at a G/P ratio of about 2.1 times the minimum G/P ratio (2,500 lbs/hr/1,200 lbs/hr).

The partially degassed stream containing approximately 8 ppm of heavy hydrocarbons comprised of 1-hexene and n-hexane is discharged through the bottom of the first degassing chamber.

Next, the partially degassed stream is introduced into the top of a second degassing chamber. Towards the bottom of the second degassing chamber, a purge fluid consisting of pure nitrogen at 80° C. is fed at a rate of 500 lbs/hr. The average temperature of the solids in the second degassing chamber is approximately 78° C. and the pressure is controlled at 18 psia. A level of solid polymer flake is maintained in the second degassing chamber such that the nitrogen purge fluid permeates and rises through the bed of solid polymer flake. The solid polymer flake is continuously moving downward through the bed in a plug flow pattern. The nitrogen purge fluid leaves the top of the bed of solid polymer flake and is continuously discharged from the top of the vessel as a spent nitrogen stream. The level of solids in the second degassing chamber is controlled such that the solid polymer flake has a residence time that provides about 10 minutes of contact with the rising purge fluid. The solid polymer flakes are discharged from the second degassing chamber as a fully degassed stream.

The spent nitrogen stream from the second degassing column and comprising nitrogen, ethylene, and small concentrations of heavy hydrocarbon was directed to a hydrocarbon destruction device.

The minimum G/P ratio for the second degassing chamber for the above conditions is calculated to be approximately 0.001 lb of nitrogen per pound of solid polymer flake, using the equation above, and the interstitial volume was calculated using the equation below:

$$R_{interstitial} = V_{flake} * \left(1 - \frac{SBD}{D}\right)$$

In these calculations, SBD=32 lbs/ft$^3$, D=57 lbs/ft$^3$, $V_{flake}$=(75,000 lbs/hr)/(32 lbs/ft$^3$ settled bulk density)=2,344 ft$^3$/hr. $R_{intersticial}$=(2,344)*(1−32/57)=1,028 ft$^3$/hr, density of $N_2$ at 78° F. and 18 psia=0.073 lbs/ft$^3$, min purge gas to second degassing chamber=0.073*1028=75 lbs/hr. Thus, the minimum G/P ratio for the second degassing chamber is 75/75000=0.001 lb/lb Therefore, the second degassing chamber is operated at a G/P ratio of about 6.7 times the minimum required G/P ratio (500 lbs/hr/75 lbs/hr). The fully degassed stream contains less than 5 ppm of heavy hydrocarbons and less than 2 ppm of the light hydrocarbon ethylene.

ASPECTS

The invention is described above with reference to numerous aspects and aspects, and specific examples. Many variations will suggest themselves to those skilled in the art in light of the above detailed description. All such obvious variations are within the full intended scope of the appended claims. Other aspects of the invention can include, but are not limited to, the following (aspects typically are described as "comprising" but, alternatively, can "consist essentially of" or "consist of" unless specifically stated otherwise)

In accordance with a first aspect of the present disclosure, a system for polymerizing one or more olefin monomers according to a first aspect, comprising: a polymerization reactor configured to polymerize one or more olefin monomers and produce a product stream comprising solid polymer flake entrained in a fluid; a flash chamber configured to separate the solid polymer flake from the fluid and to produce a fluid stream and a concentrated stream, wherein the fluid stream comprises the solid polymer flake in a lower concentration than in the product stream and the concentrated stream comprises the solid polymer flake in a higher concentration than in the product stream; a first degassing chamber configured to separate the concentrated stream by contacting the concentrated stream with a purge fluid comprising one or more light hydrocarbons to produce a partially degassed polymer flake stream and a purge fluid stream, wherein the partially degassed polymer flake stream comprises the fluid in a lower concentration than in the concentrated stream and the purge fluid stream comprises the solid polymer flake in a lower concentration than in the concentrated stream.

In accordance with a second aspect of the present disclosure, the system of the first aspect is described, wherein the fluid stream contains less than about 5 wt. % solid polymer flake and the concentrated stream contains more than about 80 wt. % solid polymer flake.

In accordance with a third aspect of the present disclosure, the system of any one of the first or second aspects is described, wherein the partially degassed polymer flake stream contains less than about 1 wt. % fluid and the purge fluid stream contains less than about 1 wt. % solid polymer flake.

In accordance with a fourth aspect of the present disclosure, the system of any one of the first to third aspects is described, wherein the flash chamber and the first degassing chamber are both within a single piece of equipment.

In accordance with a fifth aspect of the present disclosure, the system of any one of the first to fourth aspects is described, further comprising a second degassing chamber configured to produce a fully degassed polymer flake stream by contacting the partially degassed polymer flake stream with a second purge stream comprising nitrogen to produce the fully degassed polymer flake stream and a used nitrogen stream, wherein the fully degassed polymer flake stream comprises the fluid at a lower concentration than in the partially degassed polymer flake stream and the used nitrogen stream comprises the solid polymer flake in a lower concentration than in the partially degassed polymer flake stream.

In accordance with a sixth aspect of the present disclosure, the system of the fourth aspect is described, wherein the fully degassed polymer flake stream contains less than about 100 ppmw of the fluid.

In accordance with a seventh aspect of the present disclosure, the system of any one of the first to sixth aspects is described, wherein the fluid comprises at least one of the one or more olefin monomers.

In accordance with an eighth aspect of the present disclosure, the system of any one of the first to seventh aspects is described, wherein the fluid is a gas.

In accordance with a ninth aspect of the present disclosure, the system of any one of the first to seventh aspects is described, wherein the fluid is a liquid.

In accordance with a tenth aspect of the present disclosure, the system of any one of the first to seventh aspects is described, wherein the polymerization reactor comprises a gas phase reactor.

In accordance with an eleventh aspect of the present disclosure, the system of any one of the first to seventh or ninth aspects is described, wherein the polymerization reactor comprises a liquid phase reactor.

In accordance with a twelfth aspect of the present disclosure, the system of the eleventh aspect is described, wherein the liquid phase reactor is a loop slurry reactor or an autoclave reactor.

In accordance with a thirteenth aspect of the present disclosure, the system of any one of the first to twelfth aspects is described, wherein the purge fluid stream is recycled to the polymerization reactor.

In accordance with a fourteenth aspect of the present disclosure, the system of any one of the first to thirteenth aspects is described, wherein the one or more olefins comprise ethylene and the polymer flake comprises polyethylene.

In accordance with a fifteenth aspect of the present disclosure, the system of any one of the first to fourteenth aspects is described, wherein the polymerization reactor is further configured to polymerize one or more olefins in the presence of one or more heavy hydrocarbons.

In accordance with a sixteenth aspect of the present disclosure, the system of any one of the first to fifteenth aspects is described, wherein the first degassing chamber has a residence time of from about 5 minutes to about 180 minutes.

In accordance with a seventeenth aspect of the present disclosure, the system of any one of the first to sixteenth aspects is described, wherein the second degassing chamber has a residence time of from about 5 minutes to about 180 minutes.

In accordance with an eighteenth aspect of the present disclosure, the system of any one of the fifth to fifteenth aspects is described, wherein the first degassing chamber and the second degassing chamber have a combined residence time of from about 30 minutes to about 180 minutes.

In accordance with a nineteenth aspect of the present disclosure, the system of any one of the first to eighteenth aspects is described, wherein the weight ratio of purge fluid to polymer flake in the concentrated stream is from about 0.005 to about 1.

In accordance with a twentieth aspect of the present disclosure, the system of any one of the first to nineteenth aspects is described, wherein the weight ratio of the second purge fluid to the polymer flake in the partially degassed stream is from about 0.001 to about 0.03.

In accordance with a twenty-first aspect of the present disclosure, a process for polymerizing one or more olefin monomers comprising: polymerizing one or more olefin monomers in a polymerization reactor to form a product stream comprising solid polymer flake entrained in a fluid; passing the product stream to a flash chamber to produce a fluid stream and a concentrated stream of polymer flake entrained in the fluid, wherein the fluid stream comprises the solid polymer flake in a lower concentration than in the product stream and the concentrated stream comprises the solid polymer flake in a higher concentration than in the product stream; passing the concentrated stream to a first degassing chamber, wherein a first purge fluid comprising one or more light hydrocarbons contacts the concentrated stream to produce a partially degassed polymer flake stream and a purge fluid stream wherein the partially degassed polymer flake stream comprises the fluid in a lower concentration than in the concentrated stream and the purge fluid stream comprises the solid polymer flake in a lower concentration than in the concentrated stream.

In accordance with a twenty-second aspect of the present disclosure, the twenty-first aspect is described, wherein the fluid stream contains less than about 5 wt. % solid polymer flake and the concentrated stream contains more than about 80 wt. % solid polymer flake.

In accordance with a twenty-third aspect of the present disclosure, the system of any one of the twenty-first or twenty-second aspects is described, wherein the partially degassed polymer flake stream contains less than about 1 wt. % fluid and the purge fluid stream contains less than about 1 wt. % solid polymer flake.

In accordance with a twenty-fourth aspect of the present disclosure, the system of any one of the twenty-first to twenty-third aspects is described, further comprising passing the partially degassed polymer flake stream to a second degassing chamber, wherein a second purge fluid comprising nitrogen contacts the partially degassed polymer flake stream to produce a fully degassed polymer flake stream and a used nitrogen stream, wherein the fully degassed polymer flake stream comprises the fluid at a lower concentration than in the partially degassed polymer flake stream and the used nitrogen stream comprises the solid polymer flake in a lower concentration than in the partially degassed polymer flake stream.

In accordance with a twenty-fifth aspect of the present disclosure, the system of the twenty-fourth aspect is described, wherein the fully degassed polymer flake stream contains less than about 100 ppmw of the fluid.

In accordance with a twenty-sixth aspect of the present disclosure, the system of any one of the twenty-first to twenty-fifth aspects is described, wherein the fluid comprises at least one of the one or more olefin monomers.

In accordance with a twenty-seventh aspect of the present disclosure, the system of any one of the twenty-first to twenty-sixth aspects is described, wherein the fluid is a gas.

In accordance with a twenty-eighth aspect of the present disclosure, the system of any one of the twenty-first to twenty-sixth aspects is described, wherein the fluid is a liquid.

In accordance with a twenty-ninth aspect of the present disclosure, the system of any one of the twenty-first to twenty-seventh aspects is described, wherein the polymerization reactor comprises a gas phase reactor.

In accordance with a thirtieth aspect of the present disclosure, the system of any one of the twenty-first to twenty-sixth or twenty-eighth aspects is described, wherein the polymerization reactor comprises a liquid phase reactor.

In accordance with a thirty-first aspect of the present disclosure, the system of the thirtieth aspect is described, wherein the liquid phase reactor is a loop slurry reactor or an autoclave reactor.

In accordance with a thirty-second aspect of the present disclosure, the system of any one of the twenty-first to thirty-first aspects is described, further comprising recycling the purge fluid stream to the polymerization reactor.

In accordance with a thirty-third aspect of the present disclosure, the system of any one of the twenty-first to thirty-second aspects is described, wherein the one or more olefins comprise ethylene and the polymer flake comprises polyethylene.

In accordance with a thirty-fourth aspect of the present disclosure, the system of any one of the twenty-first to thirty-third aspects is described, further comprising polymerizing the one or more olefins in the presence of one or more heavy hydrocarbons.

In accordance with a thirty-fifth aspect of the present disclosure, the system of any one of the twenty-first to thirty-fourth aspects is described, wherein the first degassing chamber has a residence time of from about 5 minutes to about 180 minutes.

In accordance with a thirty-sixth aspect of the present disclosure, the system of any one of the twenty-fourth to thirty-fifth aspects is described, wherein the second degassing chamber has a residence time of from about 5 minutes to about 180 minutes.

In accordance with a thirty-seventh aspect of the present disclosure, the system of any one of the twenty-fourth to thirty-fourth aspects is described, wherein the first degassing chamber and the second degassing chamber have a combined residence time of from about 30 minutes to about 180 minutes.

In accordance with a thirty-eighth aspect of the present disclosure, the system of any one of the twenty-first to thirty-seventh aspects is described, wherein the weight ratio of purge fluid to polymer flake in the concentrated stream is from about 0.005 to about 1.

In accordance with a thirty-ninth aspect of the present disclosure, the system of any one of the twenty-first to thirty eighth aspects is described, wherein the weight ratio of the second purge fluid to the polymer flake in the partially degassed stream is from about 0.001 to about 0.03.

What is claimed is:

1. A system for polymerizing one or more olefin monomers, comprising:
   a polymerization reactor configured to polymerize one or more olefin monomers and produce a product stream comprising solid polymer flake entrained in a fluid;
   a flash chamber configured to separate the solid polymer flake from the fluid and to produce a fluid stream and a concentrated stream of solid polymer flake entrained in the fluid, wherein the fluid stream comprises the solid polymer flake in a lower concentration than in the product stream, and wherein the concentrated stream comprises the solid polymer flake in a higher concentration than in the product stream;
   a flash recycle line fluidically coupling the flash chamber to the polymerization reactor, wherein the flash recycle line is configured to recycle the fluid stream from the flash chamber to the polymerization reactor,
   a degassing chamber configured to separate the concentrated stream by contacting the concentrated stream with a purge fluid comprising one or more light hydrocarbons to produce a partially degassed polymer flake stream and a purge fluid stream, wherein the purge fluid has a superficial velocity about 90% or less of a minimum fluidization velocity of the solid polymer flake, wherein the partially degassed polymer flake stream comprises the fluid in a lower concentration than in the concentrated stream and the purge fluid stream comprises the solid polymer flake in a lower concentration than in the concentrated stream; and
   a purge recycle line fluidically coupling the degassing chamber to the polymerization reactor, wherein the purge recycle line is configured to recycle the purge fluid stream from the degassing chamber to the polymerization reactor,
   wherein the flash chamber and the degassing chamber are both within a single piece of equipment, and
   wherein the purge recycle line is distinct from the flash recycle line.

2. The system of claim 1, wherein the one or more light hydrocarbons comprises methane, ethane, ethylene, propane, isopropane, propylene, isopropylene.

3. The system of claim 1, wherein the purge fluid comprises at least one of the one or more olefin monomers.

4. The system of claim 1, wherein the fluid is a gas.

5. The system of claim 1, wherein the fluid is a liquid.

6. The system of claim 1, wherein the one or more olefin monomers comprises ethylene and the polymer flake comprises polyethylene.

7. The system of claim 1, wherein the polymerization reactor is further configured to polymerize one or more olefin monomers in the presence of one or more heavy hydrocarbons.

8. The system claim 1, wherein the degassing chamber has a residence time of from about 30 minutes to about 180 minutes.

9. The system of claim 1, wherein a weight ratio of the purge fluid to the solid polymer flake in the concentrated stream is from about 0.005 to about 1.

10. The system of claim 1, wherein the degassing chamber has a length, and wherein an introduction point of the purge fluid is less than about 20% along the length of the degassing chamber, in the direction of a flow of the purge fluid.

11. A process for polymerizing one or more olefin monomers comprising:
   polymerizing one or more olefin monomers in a polymerization reactor to form a product stream comprising solid polymer flake entrained in a fluid;
   passing the product stream to a flash chamber to produce a fluid stream and a concentrated stream of solid polymer flake entrained in the fluid, wherein the fluid stream comprises the solid polymer flake in a lower concentration than in the product stream and the concentrated stream comprises the solid polymer flake in a higher concentration than in the product stream;
   recycling the fluid stream from the flash chamber to the polymerization reactor;
   passing the concentrated stream to a degassing chamber being in a single piece of equipment as the flash chamber, wherein a purge fluid comprising one or more light hydrocarbons contacts the concentrated stream to produce a partially degassed solid polymer flake stream and a purge fluid stream, wherein the purge fluid has a superficial velocity about 90% or less of a minimum fluidization velocity of the solid polymer flake, wherein the partially degassed polymer flake stream comprises the fluid in a lower concentration than in the concentrated polymer flake stream and the purge fluid stream comprises the solid polymer flake in a lower concentration than in the concentrated stream; and
   recycling the purge fluid stream separately from the fluid stream to the polymerization reactor.

12. The process of claim 11, wherein the one or more light hydrocarbons comprises methane, ethane, ethylene, propane, isopropane, propylene, isopropylene.

13. The process of claim 11, wherein the fluid comprises at least one of the one or more olefin monomers.

14. The process of claim 11, wherein the one or more olefin monomers comprises ethylene and the polymer flake comprises polyethylene.

15. The process of claim 11, wherein the fluid is a gas.

16. The process of claim 11, wherein the fluid is a liquid.

17. The process of claim 11, wherein the degassing chamber has a residence time of from about 30 minutes to about 180 minutes.

18. The process of claim 11, wherein a weight ratio of the purge fluid to the solid polymer flake in the concentrated stream is from about 0.005 to about 1.

19. The process of claim 11, wherein the purge fluid consists essentially of ethylene.

20. The process of claim 11, wherein the purge fluid is added to the degassing chamber at a point which is less than about 20% along the length of the degassing chamber.

* * * * *